UNITED STATES PATENT OFFICE.

OTTO GERNGROSS, OF GRUNEWALD, NEAR BERLIN, AND HERMANN KAST, OF CHARLOTTENBURG, GERMANY.

SALTS OF ACETYLSALICYLIC ACID AND PROCESS OF MANUFACTURE OF SAME.

1,217,862.      Specification of Letters Patent.      Patented Feb. 27, 1917.

No Drawing.      Application filed December 4, 1912. Serial No. 734,912.

*To all whom it may concern:*

Be it known that we, OTTO GERNGROSS, a subject of the Emperor of Austria-Hungary, residing at 10 Taunusstrasse, Grunewald, near Berlin, Germany, and HERMANN KAST, a subject of the Emperor of Germany, residing at 44/45 Kantstrasse, Charlottenburg, near Berlin, Germany, have invented certain new and useful Improvements in Salts of Acetylsalicylic Acid and Processes of Manufacture of Same; and we do hereby declare the following to be a full, clear, and exact description of the invention, such as will enable others skilled in the art to which it appertains to make and use the same.

Our invention relates to salts of acetyl-salicylic acid and process of manufacture of salts of acetyl-salicylic acid.

Certain salts of acetyl-salicylic acid have been prepared according to a particular method, in which water was as far as possible excluded in the manufacture thereof and only organic solvents have been used. It was supposed that the salts of acetyl-salicylic acid were unstable in watery solution.

We have however found, that the salts of acetyl-salicylic acid are also obtainable in a suspension or solution in water with highest purity and greatest yield and are entirely or almost entirely free from decomposition products or similar impurities.

For manufacture of salts of acetyl-salicylic acid we bring to reaction on one hand, acetyl-salicylic acid dissolved or suspended in water, on the other hand, a combination of any metal in a firm state or in solution.

It must be remarked that we take care that during the operation an alkaline reaction of any kind is avoided as far as possible and as we use a strong alkaline combination—for instance NaOH—the alkaline reaction and decomposition of the reacting masses is avoided by constant stirring and cooling.

In carrying out our invention we proceed as follows:

Acetyl-salicylic acid is dissolved or suspended in water, thereto we add the required or nearly required amount of a combination of the metal the salt of which we intend to prepare, for instance the carbonate being in a solid state or dissolved in water in small quantities preferably under stirring or shaking and if desired under cooling. After being filtered, centrifugated, or otherwise cleaned we concentrate the clear solution to the desired degree preferably by using a vacuum; then we allow crystallization and separate the crystallized salt in any well known manner.

If the produced salts are very easily soluble in water and if it is not desired to remove all the water by evaporation the separation may also be worked out by adding to the watery solution from which the salts have commenced to crystallize slowly and in small portions, any suitable organic precipitating agent, for instance acetone, alcohol, ether, hydrocarbon or the like or a mixture of two or more of these.

For preparing salts of acetyl-salicylic acid not only the carbonates of a metal can be used, but also any other metal combination for instance the hydroxid, oxid, bicarbonate, silicate and so on. The terms "combination of a metal" or "metal combination" can be generally used to define the substances employed in our process. When using the hydroxid, oxid, bicarbonate, carbonate and so on, the solution contains after reaction only the desired salt of the acetyl-salicylic acid as sole solid product and the solution thereof may be evaporated to a dry mass being the desired product. When employing as a metal combination other than the just mentioned ones such a substance the acid part of which remains in the solution, for instance the silicates of alkalies, alkaline-earths and so on there is another product besides the desired salt of acetyl-salicylic acid in solution. The separation is then likewise done by evaporation of the solution to a small volume preferably using a vacuum and then filtering or removing for instance the silicic acid whereon the salt of acetyl-salicylic acid is separated as above mentioned.

The use of substances of this kind is very advantageous because the acid part, for instance the silicic acid, prevents as far as possible a hydrolysis of the formed salt of the acetyl-salicylic acid or that being formed. Therefore we use this method especially for manufacturing the salts of the alkali and alkaline-earth metals. The produced salts generally contain a small amount of the acid, for instance the silicic acid (less than 1 per cent.), which is not disadvantageous.

As a metal combination, a halogenid, (chlorid and so on) or any salt of any oxygen acid of sulfur (for instance sulfate, sulfite), or of nitrogen (nitrate, nitrite), any salt of the oxygen acids of phosphorus (phosphate), a borate, and so on may be used. In this case it is necessary to decompose or alter these combinations to form a hydroxid, oxid or carbonate, which is done for instance by bringing acetyl-salicylic acid and the required amount of the employed combination, for instance the chlorid of any metal, together in solution or suspension in water and add the required or preferably nearly required amount of an alkaline (basic) body, for instance ammonia, caustic alkali, alkali-metal carbonate or bicarbonate and so on, in small quantities by vigorous stirring or similar treatment and, if desired, by cooling. After finishing the reaction the separation may be done in the above given manner or we preferably execute it in such manner that the one of the formed salts is easily soluble in water and the other one is not, or, with difficulty, soluble in water. The separation is then performed by filtering or the like, the insoluble or difficultly soluble salt and treating the filtered solution according to the above mentioned method for the preparation of the salt which is in solution.

Thus we have prepared the salts of acetyl-salicylic acid of the following metals: Na, K, Li, Ca, Ba, Sr, Mg, Zn, Ag, Bi, Ce, Dy, and so on.

We declare that the invention is not restricted to the salts of the cited elements and salts of other elements can also be manufactured according to the present process.

The manner of manufacture of the salts of the acetyl-salicylic acid may be clearly shown by way of the following examples:

I.

200 parts of acetyl-salicylic acid are suspended in 500 parts of water and 56 parts of carbonate of magnesia are slowly added in small portions and while stirring. After filtration the clear solution is evaporated using a vacuum at 40°–50° centigrade. The crystallized Mg-salt of acetyl-salicylic acid is then separated and forms clear plates, soluble in about 3 parts of cold water, easily soluble in alcohol soluble in acetone, insoluble in ether. Ether does not precipitate the salt from its alcoholic solution, but ligroin will do so. The salt sinters at 120° centigrade and melts at 158°–160° centigrade with development of gases. It contains 3 molecules of water of crystallization according to the formula: $C_{18}H_{14}O_8Mg,3H_2O$.

II.

To 100 parts of acetyl-salicylic acid suspended in 200 parts of water are added in small portions 80 parts of silicate of sodium dissolved in 300 parts of water, by stirring of the mass. The silicic acid is at first colloidal but soon changes to a precipitate which can be filtered off. After separation by filtering or the like the silicic acid is washed out by means of a small quantity of cold water. The filtrate is then treated by evaporation in a vacuum at low temperature. In order to accelerate the separation of the silicic acid alcohol is preferably added to the reacting mass which is then treated according to the manner above mentioned.

The salt of sodium forms long needles easily soluble in water though somewhat less soluble in alcohol. Especially ether, but also acetone, ligroin, benzene and so on separate the salt from the solution in alcohol. The taste is at first a little salty and afterward a little sweet. The substance sinters at 210 centigrade and melts at 218 centigrade to a clear liquid giving off gases.

III.

200 parts of acetyl-salicylic acid and preferably the required amount of sulfate of zinc—108 parts of this salt free from water—are stirred in 700 parts of water, and 444 parts of caustic sodium-lye (of 10%) are then added in small portions preferably under cooling. The acetyl-salicylate of zinc separates in form of rhombic plates which may be washed with a little cold water.

One part of this salt is soluble in 35–40 parts of water of usual temperature, the salt is easily soluble in alcohol, soluble in warm acetone and only little soluble in ether. The watery solution has an astrigent taste like as tannin. The salt sinters at 115 centigrade, melting between 155–162 centigrade to a clear liquid.

The qualities of some other salts of acetyl-salicylic acid may be mentioned as follows:

The acetyl-salicylate of potassium forms beautiful clear brittle plates soluble in 4–5 parts of water at usual temperature. It melts at nearly 70 centigrade, the liquid becoming clear at about 130 centigrade giving gases off, and becomes stiff to a crystalline mass at 170–175 centigrade.

The salt of lithium forms prisms soluble in water and alcohol, nearly insoluble in acetone. Ether precipitates the salt from its alcoholic solution in the form of needles. The watery solution has a fresh taste, a little salty and afterward a sweet taste. This salt sinters at 170 centigrade and melts between 190–200 centigrade to an obsidian like mass.

The salt of lime forms prisms. The product for instance precipitated out of the alcoholic solution has the formula: $C_{18}H_{14}O_8Ca2Aq$. and the salt directly obtained from the watery solution according to our process has the formula: $C_{18}H_{14}O_8Ca,3.5Aq$. The latter product needs about 5.5–6.5 parts of water to be dissolved. The salt forms at 135 centigrade and changes to a clear liquid.

The salt of cerium is soluble in water and alcohol and sinters at 80 centigrade, foaming at 114 C., at 123 centigrade the molten mass becomes a chocolate-like color. The solution becomes a beautiful violet color when ferric chlorid is added.

The salt of silver forms long needles nearly insoluble in water and nearly insensible to light.

The salt of mercury easily forms double-salts for instance with chlorid of sodium, tartaric acid and their salts and so on. These double salts are soluble in water and alcohol and are precipitated from their solution by ether.

These and other salts can be obtained according to our process herein described in a pure state without giving the well known phenol characteristic reaction of salicylic acid with ferric chlorid.

All salts are well crystallized substances and have generally a sweet aftertaste.

We claim:

1. The process of manufacturing salts of acetyl-salicylic acid comprising the combining of acetylsalicylic acid with a base in the presence of water, concentrating the resulting solution at a low temperature and recovering the acetylsalicylate by crystallization, substantially as described.

2. The process of manufacturing salts of acetyl-salicylic acid comprising the combining of acetylsalicylic acid with a base in the presence of water, concentrating the resulting solution at a low temperature under a vacuum and recovering the acetylsalicylate by crystallization, substantially as described.

3. The process of manufacturing salts of acetylsalicylic acid comprising the slow addition of a substance containing a base in small portions at a time to water containing the acetylsalicylic acid in suspension and recovering the resulting acetylsalicylate by crystallization, substantially as described.

4. The process of manufacturing salts of acetylsalicylic acid comprising the slow addition of a substance containing a base in small portions at a time to water containing the acetylsalicylic acid in suspension, evaporating the resulting solution at a low temperature and recovering the acetylsalicylate by crystallization, substantially as described.

5. The process of manufacturing salts of acetylsalicylic acid comprising the slow addition of a substance containing a base in small portions at a time to water containing the acetylsalicylic acid in suspension, evaporating the resulting solution at a low temperature under a vacuum and recovering the acetylsalicylate by crystallization, substantially as described.

6. The process of manufacturing salts of acetylsalicylic acid comprising the slow addition of a substance containing a base in small portions at a time to water containing the acetylsalicylic acid in suspension, evaporating the resulting solution at a low temperature, filtering the solution, and recovering the acetylsalicylate by crystallization, substantially as described.

7. The process of manufacturing salts of acetylsalicylic acid comprising the slow addition of a substance containing a base in small portions at a time to water containing the acetylsalicylic acid in suspension, evaporating the solution at a low temperature and adding slowly and in small portions an organic precipitating agent, allowing the acetylsalicylate to crystallize and removing the crystals from the solution, substantially as described.

8. A new chemical compound comprising acetyl-salicylate of magnesium containing three molecules of water of crystallization, being a white crystalline salt soluble in about three parts of water, easily soluble in alcohol, less soluble in acetone, and insoluble in ether.

9. A stable crystallized magnesium salt of acetyl-salicylic acid having in general a sweet aftertaste.

10. A stable crystallized magnesium salt of acetyl-salicylic acid.

In testimony whereof we affix our signatures in the presence of two witnesses.

OTTO GERNGROSS.
HERMANN KAST.

Witnesses:
 WALDEMAR HAUPT,
 HENRY HASPER.